United States Patent [19]

Banach et al.

[11] Patent Number: 5,252,352

[45] Date of Patent: Oct. 12, 1993

[54] PROCESS OF PREPARING AN EXTRA LOWFAT SPREAD

[75] Inventors: Gerald Banach, Columbia; Leendert H. Wesdorp, Ellicott City; Frank S. Fiori, Elkridge, all of Md.

[73] Assignee: Van den Bergh Foods Co., Division of Conopco, Inc., Lisle, Ill.

[21] Appl. No.: 847,974

[22] Filed: Mar. 6, 1992

[51] Int. Cl.$^5$ .............................................. A23D 7/00
[52] U.S. Cl. .................... 426/580; 426/519; 426/520; 426/522; 426/573; 426/576; 426/577; 426/578; 426/585; 426/603
[58] Field of Search ............... 426/573, 576, 577, 578, 426/580, 585, 582, 603, 519, 520, 522

[56] References Cited

U.S. PATENT DOCUMENTS

| | | |
|---|---|---|
| 2,098,764 | 11/1937 | Sharpless . |
| 2,098,765 | 11/1937 | Sharpless . |
| 2,160,159 | 5/1939 | Lundstedt et al. . |
| 3,397,994 | 8/1968 | Elenbogen et al. . |
| 3,929,892 | 12/1975 | Hynes et al. . |
| 3,982,039 | 9/1976 | Scibelli et al. . |
| 4,103,037 | 7/1978 | Bodor et al. . |
| 4,244,983 | 1/1981 | Baker . |
| 4,273,790 | 6/1981 | Bosco et al. ................... 426/604 |
| 4,308,294 | 12/1981 | Rispoli et al. ................. 426/576 |
| 4,379,175 | 4/1983 | Baker . |
| 4,389,426 | 6/1983 | Reissmann et al. . |
| 4,497,834 | 2/1985 | Barta . |
| 4,551,346 | 11/1985 | Kilroy . |
| 4,552,774 | 11/1985 | Gronfor . |
| 4,631,196 | 12/1986 | Zeller . |
| 4,724,152 | 2/1988 | Baker et al. . |
| 4,734,287 | 3/1988 | Singer et al. . |
| 4,749,584 | 6/1988 | Wirchansky et al. . |
| 4,752,494 | 6/1988 | Tang et al. . |
| 4,956,193 | 9/1990 | Cain et al. ...................... 426/576 |
| 4,961,953 | 10/1990 | Singer et al. . |
| 4,978,553 | 12/1990 | Silver . |
| 4,981,709 | 1/1991 | Furcsik et al. . |
| 4,985,270 | 1/1991 | Singer et al. . |
| 5,011,701 | 4/1991 | Baer et al. . |
| 5,013,573 | 5/1991 | Bodor et al. .................... 426/585 |
| 5,064,660 | 11/1991 | Silver . |
| 5,079,024 | 1/1992 | Crane . |
| 5,080,921 | 1/1992 | Reimer . |

FOREIGN PATENT DOCUMENTS

| | | |
|---|---|---|
| 0345226 | 12/1989 | European Pat. Off. . |
| 0468560 | 1/1992 | European Pat. Off. . |
| 2229077 | 9/1990 | United Kingdom . |

OTHER PUBLICATIONS

Glicksman, Martin. "Food Hydrocolloids" vol. III, pp. 48, 50, 65, 66, 76, 206–211, 226–227. CRC Press, Inc., Boca Raton, Fla.
Abstract of EP 386336.
Abstract of FR 2247168.
Abstract of FR 2224096.
Abstract of EP 344651.
Beatreme Dairyland Product Specification, MP-20®, Melotein MP14®, Melotein MP34®, Melotein MP25®.

Primary Examiner—Helen F. Pratt
Attorney, Agent, or Firm—Rimma Mitelman

[57] ABSTRACT

Processes for preparing a water-continuous margarine-like spread containing non-denatured casein. The spread contains less than 5% fat, or even less than 3.25% fat. The spread includes a particular gel-forming system and/or the spread is prepared by utilizing electrodialysed dairy ingredients. The inventive processes employ a double homogenization step and the first homogenization step takes place prior to heating.

9 Claims, No Drawings

PROCESS OF PREPARING AN EXTRA LOWFAT SPREAD

FIELD OF THE INVENTION

The invention relates to extra low fat margarine-like spreads and to processes of preparing the spreads.

BACKGROUND OF THE INVENTION

In light of the rising consumer demand for low fat, low calorie products, food scientists are faced with a challenging task of producing a spread which has the texture, spreadability, and organoleptic properties similar to margarine but which contains less than 80% fat typically present in margarine. It is particularly difficult to attain the spreadability, body, texture, and taste of margarine in spreads containing 5% or less fat, or in spreads containing practically no fat.

Cheese spreads containing fat at low levels have been disclosed. For instance, Baker discloses a method of preparing a low fat cream cheese; the method includes the steps of admixing milk, a fat-containing carrier and a stabilizer and heating the mixture to a temperature in the range of from 150° to 200° F., admixing dry cottage cheese curd, and homogenizing the curd mixture at pressures in the range 500 to 5000 psi. Cottage cheese curd comprises 70 to 85% of the product. The fat content of the product is from about 0.7% to less than about 2%. The resulting low fat cream cheese type product resembles cream cheese in appearance, texture, and taste.

With respect to margarine-like products, a number of references disclose formulations, which although they contain lower levels of fat than margarine, still include more than 5% fat. Great Britain Patent application 2,229,077, for example, discloses a margarine containing 5-30% fat mixture containing hardened fat, 8-15% maltodextrin, optionally 0.5-3% modified starch, 1-2% whey protein concentrate, 0.4-0.6% gelatine. The process disclosed in the '077 application for making the margarine employs a step of homogenizing a heated blend at a pressure of at least 11,600 psi. Barta, U.S. Pat. No. 4,497,834, discloses a dairy-based non-cheese food product, which may contain from 5 to 40% fat. Non-fat milk solids comprise 15 to 50% of the product. The product may include a stabilizer, e.g. carboxymethylcellulose. Bodor, U.S. Pat. No. 4,103,037, discloses a low fat spread containing 25-65% fat, which includes carboxymethylcellulose, cheese curd, and gelatine.

Bodor et al., U.S. Pat. No. 5,013,573 discloses spreads containing 20-90% fat, and containing a demineralized, deacidified milk.

With respect to extra low fat margarine-like spreads (less than 5% fat), Cain et al., U.S. Pat. No. 4,956,193, disclose an edible plastic dispersion containing 1-10% fat, which includes maltodextrin and gelatin. The Examples of the Cain patent contain 9-12% maltodextrin. Small cheese particles may be included in the dispersion in order to obtain a cheese spread. A commonly assigned, copending application Ser. No. 733,500 discloses a concentrated casein containing dispersion of substantially aggregated casein, preferably obtained from yoghurt or quark, which dispersion has a dry matter content of 10-80 wt %, pH of 4.8-5.2, the dispersion being free from live, milk fermenting bacteria. The dispersion is said to be useful as fat replacer in low fat or zero fat spreads.

Although stable and spreadable extra very low fat spreads may be produced according to the above disclosures, it has been found, as part of the present invention, that spreads which even more closely approximate the taste of margarine are desirable and may be obtained. Particularly, extra very low fat spreads containing casein have more acidic taste than is typically associated with margarine and it is desirable to decrease this acidic taste.

Accordingly, it is an object of the invention to provide a water-continuous spread which contains fat at a level not greater than 5% yet is margarine-like in body, texture, and organoleptic perception.

It is another object of the invention to provide a water-continuous spread which contains fat at a level not greater than 3.25%, or even at a level not greater than 0.25%, yet is margarine-like in body, texture, and organoleptic properties.

It is another object of the invention to provide an extra very low fat margarine-like spread which contains casein and yet contains less than 1.05%, or even less than 0.7%, ash.

It is still another object of the invention to provide an extra very low fat spread prepared from an electrodialysed milk or electrodialysed milk ingredient.

It is yet another object of the invention to provide a process of preparing an extra very low fat water-continuous margarine-like spread.

It is still another object of the invention to provide a process of preparing an extra very low fat spread from a milk blend.

It is still another object of the invention to provide a process of preparing an extra very low fat spread from electrodialysed milk or electrodialysed dairy ingredient.

These and other objects of the invention will become more apparent from the detailed description and examples which follow.

SUMMARY OF THE INVENTION

The above objects are attained by the present invention which includes a water-continuous margarine-like spread containing no more than 5% fat, preferably less than 3.25% fat. The spread according to the present invention contains casein at a level of at least 9%, typically from about 9% to about 15%.

Protein, including serum (whey) protein and casein is present in the form of particles, which may or may not be aggregated. The diameter size of the particles or the aggregates is in the range of from 2 $\mu$ to diameters of greater than 10 $\mu$, preferably the size ranges from 3 $\mu$ to 8 $\mu$.

The casein contained in the spread is non-denatured. The serum (whey) protein in the spread is substantially non-denatured; preferably at least about 80% of whey protein is non-denatured.

The inventive spread contains less than 1.05% ash, preferably less than 0.7% ash: since ash increases the buffering capacity of the spread, reducing ash levels decreases buffering capacity of the spread. This means that smaller amounts of acid are required to obtain the desired pH, thereby resulting in reduced acid flavor.

The ash content in the inventive spread (or the acidity of the spread) may be reduced by replacing part of casein in the spread with a gel-forming system including a gelling agent A and a gelling agent B, wherein a gelling agent A is selected from the group consisting of gelatin, kappa-carrageenan, iota-carrageenan, alginate, agar, gellan, pectin, and mixtures thereof, a gelling agent B is selected from the group consisting of gelling starch, denatured whey protein, denatured bovine serum protein, denatured soy protein, microcrystalline cellulose and mixtures thereof, wherein the amount of gelling agent A is from about 0.5% to about 1.5%, and the amount of gelling agent B is from about 2% to about 12%. Preferably, in order to improve organoleptic properties of the spread, the amount of gelling agent B is no greater than 8%, preferably no greater than 4%. The gelling system is also very helpful in preventing syneresis, i.e., improving the stability of the product.

Alternatively, or in addition to using the gel-forming system, the ash content in the inventive spread may be reduced by utilizing electrodialysed milk or an electrodialysed dairy ingredient in the preparation of the spread. Electrodialysis procedures removes a number of cations and anions and results in demineralization of milk.

Reduction in ash content is indicative of the overall mineral reduction.

The inventive spreads do not contain melting salts, e.g. phosphates, diphosphates, triphosphates, tripolyphosphates, pyrophosphates, hexametaphosphates, orthophosphates, aluminophopsphates, and citrates. Other melting salts include acetates and tartrates. All these salts are usually sodium salts and are typically employed to prevent the cheese-containing pasteurized food from breaking down and releasing fat and water.

The invention also includes a process of preparing an extra very low fat water-continuous margarine-like spread, the process including the steps of:

(i) preparing a mixture comprising fat at a level not greater than 5%, at least about 9% of casein, and less than 1.05% ash;

(ii) homogenizing the mixture at a pressure in the range of from about 500 to about 14,000 psi to obtain a blend;

(iii) heating the blend to a temperature in the range of from about 160° F. to about 180° F.;

(iv) homogenizing the heated blend at a pressure in the range of from about 500 to about 14,000 psi to obtain the spread; and (v) packing the spread at a temperature of at least 140° F.

According to the inventive process, the mineral content in the spread may be reduced by including in the process the step of electrodialysing milk or milk product and/or by incorporating a gel-forming system of a gelling agent A and a gelling agent B into the mixture of step (i). The inventive process employs a double homogenization step in order to attain a stable emulsion despite extremely low fat levels. Particularly, homogenization prior to heating provides a stable emulsion so that as the product is heated, it is protected.

The inventive spread may be prepared from various dairy ingredients or from one raw material (milk blend) produced by any curd precipitation procedure, followed by separation of the curd from whey. According to the present invention, in order to reduce the ash content of the spread, the various dairy ingredients or the milk blend may be obtained from electrodialysed milk.

The products of the invention maintain the desired spreadability, mouth feel, flavor and body similar to margarine, while containing extra very low level of fat or practically no fat.

DETAILED DESCRIPTION OF THE INVENTION

The ingredients used in the products and processes of the present invention are defined for purposes of this specification as follows:

"Milk" means the lacteal secretion, practically free from colostrum, obtained by the complete milking of one or more healthy cows, which may be clarified and may be adjusted by separating part of the fat therefrom to produce concentrated milk, reconstituted milk, and dry whole milk. Water, in a sufficient quantity to reconstitute concentrated and dry forms, may be added.

"Nonfat milk" means skim milk, concentrated skim milk, reconstituted skim milk, and nonfat dry milk. Water, in a sufficient quantity to reconstitute concentrated and dry forms, may be added. Nonfat dry milk is defined in detail in 21 CFR, Part 131, Section 125 incorporated by reference herein.

"Cream" means cream, reconstituted cream, dry cream, and plastic cream. Water, or milk, or skim milk, in a sufficient quantity to reconstitute concentrated and dry forms, may be added.

"Dry cottage cheese curd" and "quark" mean soft uncured curd cheese containing less than 0.5% milkfat and not more than 80% moisture. Dry curd cottage cheese is defined in more detail in 21 CFR, Part 133, Section 129 which is incorporated by reference herein.

"Low fat cottage cheese" means soft uncured curd cheese containing not less than 0.5% and not more than 2% milkfat and not more than 82.5% moisture. Low fat cottage cheese is defined in more detail in 21 CFR, Part 133, Section 131 which is incorporated by reference herein.

"Ricotta" is a soft uncured curd cheese produced by thermal setting of whey or a mixture of whey and cream and/or milk at a predetermined pH. Ricotta typically contains 2 to 16% fat. The Ricotta cheese employed in the present process preferably contains at most 10% fat, most preferably about 7% to 8% fat. "Ricottone" is a soft uncured curd cheese produced by thermal setting of whey at a predetermined pH. Ricottone contains 0% fat.

Cream cheese is a soft, uncured cheese prepared from cream or a mixture of cream and milk. Cream cheese typically contains 3–40 wt % fat. Neufchatel is a soft uncured cheese similar to cream cheese except that Neufchatel contains fat at a level of from 20 to 33 wt %.

A water continuous margarine-like spread according to the present invention contains at least about 9%, preferably from about 9% to about 15%, of casein. The ash content of the spread indicates the overall acidity of the product: decreasing ash content indicates decreasing acidity. The inventive spread preferably contains less than 1.05% ash, more preferably less than 0.7% ash, and optimally less than 0.5% ash.

The acidity of the casein-containing spread may be reduced, according to the present invention, by replacing part of casein with a gel-forming system including a gelling agent A and a gelling agent B wherein a gelling agent A is selected from the group consisting of gelatin, kappa-carrageenan, iota-carrageenan, alginate, agar, gellan, pectin, and mixtures thereof, a gelling agent B is selected from the group consisting of gelling starch, denatured whey protein, denatured bovine serum protein, denatured soy protein, microcrystalline cellulose and mixtures thereof, wherein the amount of gelling agent A is from about 0.5% to about 1.5%, and the amount of gelling agent B is from about 2% to about 12%. Preferably, in order to improve organoleptic properties of the spread, the amount of gelling agent B is no greater than 8%, preferably no greater than 4%. The gel-forming system is also very helpful in preventing syneresis, i.e. improving the stability. A preferred gelling agent A is gelatin; a preferred gelling agent B is gelling starch, such as Paselli maltodextrin SA2® (a hydrolyzed starch product).

Alternatively, or in addition to including the gel-forming system, the ash content of the inventive spread may be reduced by utilizing electrodialysed milk in preparing the spread. The electrodialysis (i.e. demineralization) and optionally, deacidifcation of milk is preferably carried out according to the disclosure of U.S. Pat. No. 5,013,573, incorporated by reference herein. As noted in that patent, demineralization of the milk or milk product is carried out for a period of time long enough to obtain:

| 0-950 | and preferably 0-350 | mg potassium/kg. |
|---|---|---|
| 0-500 | and preferably 0-150 | mg sodium/kg. |
| 0-720 | and preferably 0-250 | mg calcium/kg. |
| 0-80 | and preferably 0-20 | mg magnesium/kg. |
| 0-800 | and preferably 0-200 | mg chloride/kg. |
| 0-800 | and preferably 0-600 | mg phosphorus/kg. (organic + inorganic) |
| 0-1000 | and preferably 0-400 | mg citrate/kg and |
| 0-10000 | and preferably 0-2500 | mg lactage/kg. |

The spread of the present invention preferably includes a cellulose gum, in order to maximize the smoothness of the spread. Sodium carboxymethyl cellulose is preferably used according to the present invention. Various types of carboxymethyl cellulose may be used, regardless of degree of substitution, such as for example, CMC 7HF®, CMC 740F® and CMC 944F® (FMC Corp.). Typically, the cellulose gum is employed in an amount of from about 0.1% to about 5%, preferably at least 0.3% is employed. Most preferred cellulose gum, due to is availability and low cost, is sodium carboxymethyl cellulose. In addition to, or in the alternative to carboxymethyl cellulose, high methoxyl pectin (or high ester pectins), i.e. pectins with degree of esterification above 50% may be employed.

The spread according to the present invention preferably includes a further thickening agent selected from the group consisting of guar gum, locust bean gum, sodium alginate, propylene glycol alginate, xanthan gum, and mixtures thereof, which may be included at a level of from about 0.1% to about 1.0%, preferably at a level of from about 0.1% to about 0.7%, most preferably at a level of from about 0.25% to about 0.5%. Most preferably, a combination of guar gum and locust bean gum is employed: guar gum at a level of from about 0.1% to about 0.3% and locust bean gum at a level of from about 0.1% to about 0.5%.

The inventive spread may be prepared by any process which accomplishes homogenization, pasteurization (in any order), and packing of the product while hot. Preferably the inventive spread is prepared according to a process which is also a part of the present invention. The preferred process attains optimum smoothness and stability of the product. In the first step of the process, a mixture is prepared which contains the desired level of casein. The mixture may be obtained by combining various dairy ingredients. The dairy ingredients contribute mainly fat and protein. Thus, the amounts of various dairy ingredients must be such that the casein level of at least about 9%, preferably from about 9% to about 15%, and the fat level of no greater than 5%, preferably less than 3.25% result.

The dairy fat source is typically selected from cream, Neufchattel, cream cheese, and mixtures thereof. Typically, from about 5% to about 25% of the fat source is employed, more preferably from 10% to about 20%. The preferred fat source is acid precipitated fresh cheese, due to its reduced mineral content. The dairy protein source is selected from the group consisting of cottage cheese, low fat cottage cheese, dry curd cottage cheese, quark, creamed cottage cheese, ricotta cheese, ricotone cheese, fresh cheese and mixtures thereof. Typically, from about 30% to about 70% of the dairy protein source is employed, more preferably from about 35% to about 55%, and most preferably from about 40% to about 50%.

The preferred protein source, in order to minimize the acidity of the spread is a mineral reduced, acid precipitated curd. According to the present invention, such curd is preferably prepared by electrodialysing and milk or milk product and obtaining a precipitated curd from such product.

Curd can be separated from whey by various concentration techniques. Examples of suitable techniques include but are not limited to bag drainage, ultrafiltration, diafiltration, centrifugation, cheese vats, ion exchange and combinations thereof. Milk may be acidified prior to, during, or after electrodialysis.

Alternatively, the precipitated curd may be commercially obtained, e.g., dry curd cottage cheese.

It should be emphasized that the dairy ingredients are labeled as "fat source" and "protein source" only due to the main function performed by the ingredient. In other words, a "fat source" contributes protein in addition to fat, and a "protein source" contributes fat in addition to protein.

The mixture may include nonfat dry milk, in order to increase the solids and protein content, typically in an amount up to about 8%, more preferably in the amount of from about 4% to about 6%. The solids content of the inventive spread is in the range of from about 10% to about 35%, preferably from about 15% to about 30%, most preferably from about 25% to about 30%. The protein (casein and whey) content of the spread is in the range of from about 9% to about 18%, preferably in the range of from about 10% to about 15%. Instead of non-fat dry milk, it is preferred to use reduced mineral non fat dry milk, or whey powder (mineral reduced), or whey protein powder (mineral reduced), or total milk protein (mineral reduced), or mixtures thereof, used in the amount to attain the desired solids and protein content.

It has been found, as part of the present invention, that the acidity of extra very low fat casein-containing spreads may be reduced when mineral reduced dairy ingredients are employed. Accordingly, dairy ingredients with reduced mineral content are preferably employed in the inventive spread.

All ingredients are mixed preferably utilizing high speed mixing in any suitable mixer, e.g., Stephan mixer.

According to the inventive process, as an alternative to mixing various dairy ingredients, the desired levels of casein, fat, and other chemical components could be contributed by one raw material (milk blend) customized through the starting mix and produced by various concentration procedures, such as bag drainage, ultrafiltration, diafiltration, centrifugation, cheese vats and combinations thereof. When ultra filtration is applied, it should be carried out using a membrane that passes lactose, water, and other soluble milk components, whereas larger molecular components such as casein, whey proteins and fat are retained.

Again, in order to reduce the mineral content of the product, milk is electrodialysed prior to the concentration procedure. Thus, the inventive process preferably includes a step of electrodialysing milk in order to prepare either a single raw material, or various dairy ingredients from which casein and other chemical components of the spread are derived. Alternatively, reduced mineral level is attained by a treatment of milk or milk ingredient with ion exchange resins. The inventive process may also include a step of concentrating one or more raw materials by any concentration procedure mentioned above. It should be noted that various concentration procedures, i.e. bag drainage, ultrafiltration, diafiltration, centrifugation, cheese vats, and combinations thereof, result in further reduction of the mineral content.

In order to attain the spread according to the present invention containing less than about 0.25% fat spread, various dairy ingredients or the single raw material are prepared from skim milk.

The mixture may include optional ingredients, such as cellulose gums, thickeners, nonfat dry milk, salt, as discussed above. Also, the mixture prepared in the first step of the inventive process preferably includes the fat gel-forming system as discussed above, in order to decrease the acidity of the spread, particularly when the practitioner chooses to omit the step of electrodialysing milk. In a variation of the inventive process, gelling agent A and gelling agent B may be predissolved at a temperature sufficient to induce full hydration of the gelling agents and added to the mixture. When maltodextrin is employed, the temperature is typically in the range of from 65° to 90° C.

In the second step of the process, the mixture of various dairy ingredients or the single raw material and any optional ingredients are homogenized at a temperature in the range of 33° F. to 140° F., at a pressure in the range of from about 500 to about 14000 psi, preferably from 500 to 5000 psi, most preferably at a pressure in the range of 1500 to 2000 psi.

The first homogenization step is carried out in order to mix the ingredients thoroughly, so that a stable emulsion is produced.

According to the inventive process, the homogenized blend is then pasteurized, i.e., the blend is heated to a temperature in the range from about 160° F. to about 180° F., preferably to a temperature in the range of from about 160 to about 170° F., most preferably to about 165° F. A number of techniques may be employed to heat the blend. The examples include but are not limited to heating in a kettle, or a scrape surface heat exchanger. Mixing should be carried out during heating. Whenever the blend contacts a hot surface during heating, side wall scraper agitation should be employed.

Heating may be accomplished by steam injection, in which case side wall scraper agitation is not necessary, but mixing during the steam injection should be maintained.

A preferred heating technique is heating in the kettle, with mixing and side wall scraper agitation.

The pasteurized blend is then homogenized again using the same apparatus as used in the first step. The pressure is in the range of from 500 to 15,000 psi, preferably from 2000 to 10000 psi, and most preferably from 8000 to 10,000 psi. Preferably, the pressure is higher in the second homogenization step to improve smoothness and increase viscosity. During the second homogenization step, the temperature of the blend should be maintained at a temperature in the range of from about 160° F. to about 180° F.

Other optional ingredients include natural flavoring ingredients, vitamins such as Vitamin A or other vitamins and minor amounts, i.e. 0.1% to 1.5%, preferably 0.25% to 1% of kitchen salt. Up to 2%, preferably 0.01% to 0.5% of natural flavoring ingredients and 3,000 to 10,000 I.U. per pound, preferably about 6,000 I.U. per pound of Vitamin A may be used in the preparation of the spreads of the invention. Flavoring ingredients and vitamins are preferably added after pasteurization but prior to the second homogenization step. Up to 2% of edible acids, such as lactic acid, citric acid, tartaric acid, phosphoric acid and malic acid, and from 0.2% to 1.5% of melting salts may be employed in the preparation of the inventive products.

All steps of manufacture of the margarine-like, extra low fat spread product, including packing, are carried out under sanitary conditions. The product is packed while the product's temperature is above 140° F. This ensures good storage stability of the product. The product is stable for at least three months at refrigerator temperatures.

Further describing the inventive extra low fat spreads, the detailed preferred and optimum chemical component composition of the spreads is as follows:

|  | Preferred | Optimum |
| --- | --- | --- |
| Solids: 10–35% | 15–30% | 25–30% |
| Casein: at least 9% | 9–15% | 10–13% |
| Whey proteins | .5–3% | 1–2% |
| Carbohydrates | 1–5% | 3–5% |
| Fat | .1–5% | <3% |
| Ash | <1.05% | <.7% |
| Carboxymethyl Cellulose | .2–.5% | .3% |
| Guar Gum | .1–.25% | 0.1–0.25% |
| Salt | 0.5–1.5% | 0.8–1.2% |
| Locust Bean Gum | 0.1–0.5% | 0.1–0.3% |
| Maltodextrin | 4–12% | 3–5% |
| Gelatin | 0.5–1.5% | 0.5–1.0% |

The pH of the product is in the range of from 4.6 to 5.5, preferably from 5.0 to 5.3.

All weight %, unless indicated otherwise, are by weight of the final spread.

The following specific examples further illustrate the invention but the invention is not limited thereto.

EXAMPLES

Spreads of examples 1–3 contained less than 5% fat, yet were margarine-like in body, texture, and organoleptic properties.

Example 2 used less Neufchatel than Example 1; thus, Example 2 contained less fat than Example 1 and its total acidity was lower than in Example 1. Example 3 used reduced mineral TMP (total milk protein) and cream (which carries less acid than Neufchatel); the use of reduced mineral dairy ingredients in Example 3 resulted in a spread that was less acidic than Example 1, i.e., the total acidity in Example 3 was lower than in Example 1.

Total acidity indicates the amount of acid (as lactic acid) present in the product.

EXAMPLE 1

| | % | Pounds Batch | Grams Batch | Fat | Solids | Protein | Lactose | cal/g Calories | mg/g Cholesterol | Salt | Ash |
|---|---|---|---|---|---|---|---|---|---|---|---|
| Water | 28.6011 | 2.86 | 1297.32 | | | | | | | | |
| Neufchatel | 20.0000 | 2.00 | 907.18 | 21.75 | 36.00 | 9.00 | 2.30 | 2.53 | 0.73 | 0.25 | 1.50 |
| Dry Curd Cottage Cheese | 40.0000 | 4.00 | 1814.36 | 0.42 | 20.08 | 16.06 | 2.00 | 0.82 | 0.07 | | 0.70 |
| Non Fat Dry Milk | 5.0928 | 0.51 | 231.00 | 1.50 | 97.00 | 34.92 | 49.47 | 3.96 | 0.02 | | 7.90 |
| Paselli Maltodextrin SA2 ® | 4.0000 | 0.40 | 181.44 | 0.00 | 90.00 | 0.00 | 0.00 | 3.60 | 0.00 | | |
| Gelatin | 0.7500 | 0.08 | 34.02 | 0.10 | 100.00 | 85.60 | | 3.36 | | | |
| Salt | 1.0000 | 0.10 | 45.36 | | 100.00 | | | 4.00 | | 100.00 | |
| Carboxymethyl Cellulose | 0.3000 | 0.03 | 13.61 | | 88.00 | | | 3.52 | | | |
| Guar | 0.1500 | 0.02 | 6.8039 | | 90.50 | | | 0.20 | | | |
| Natural Butter Flavor | 0.0200 | 0.00 | 0.4536 | 100.00 | 100.00 | | | 9.00 | | | |
| Locust Bean Gum | 0.0361 | 0.00 | 1.6375 | | 85.00 | | | 0.00 | | | |
| 1% Beta Carotene CWS* | 0.0500 | 0.01 | 2.2680 | 0.00 | 0.00 | 0.00 | 0.00 | 0.00 | 0.00 | 0.00 | 0.00 |
| | 100.0000 | 10.0000 | | 4.62 | 25.97 | 10.64 | 3.78 | 125.85 | 17.50 | 1.05 | 0.98 |
| Per Serving | | | | 0.65 | 3.64 | 1.49 | 0.53 | 17.62 | 2.45 | 0.15 | 0.14 | pH = 5.23
Total Acidity = 0.90
1. Mix all ingredients cold in Stephan.
2. Homogenize at 2000 psi through Rannie Homogenizer
3. Transfer back to the Stephan and heat to 67° C.
4. Homogenize at 8000 psi through the Rannie Homogenizer
5. Package hot upside down and store @ 32–40° F.

*Cold water soluble

EXAMPLE 2

| | % | Pounds Batch | Grams Batch | Fat | Solids | Protein | Lactose | cal/g Calories | mg/g Cholesterol | Salt | Ash |
|---|---|---|---|---|---|---|---|---|---|---|---|
| Water | 35.6767 | 107.03 | 48547.78 | | | | | | | | |
| Neufchatel | 13.1700 | 39.51 | 17921.34 | 21.75 | 36.00 | 9.00 | 2.30 | 2.53 | 0.73 | 0.25 | 1.50 |
| Dry Curd Cottage Cheese | 40.0000 | 120.00 | 54430.80 | 0.42 | 29.00 | 23.20 | 2.00 | 1.18 | 0.07 | | 0.70 |
| Non Fat Dry Milk | 5.0000 | 15.00 | 6803.85 | 1.50 | 96.00 | 34.56 | 48.96 | 3.92 | 0.02 | | 8.2 |
| Paselli Maltodextrin SA2 ® | 3.9029 | 11.71 | 5310.95 | 0.00 | 90.00 | 0.00 | 0.00 | 3.60 | 0.00 | | |
| Gelatin | 0.7317 | 2.20 | 995.68 | 0.10 | 100.00 | 85.60 | | 3.36 | | | |
| Salt | 0.9715 | 2.91 | 1321.99 | | 100.00 | | | 4.00 | | 100.00 | |
| Carboxymethyl Cellulose | 0.2931 | 0.88 | 398.84 | | 88.00 | | | 3.52 | | | |
| Guar | 0.1463 | 0.44 | 199.08 | | 90.50 | | | 0.20 | | | |
| Natural Butter Flavor | 0.0240 | 0.04 | 16.3292 | 100.00 | 100.00 | | | 9.00 | | | |
| Locust Bean Gum | 0.0351 | 0.11 | 47.7630 | | 85.00 | | | 0.00 | | | |
| 1% Beta Carotene CWS | 0.0487 | 0.15 | 66.2695 | 0.00 | 0.00 | 0.00 | 0.00 | 0.00 | 0.00 | 0.00 | 0.00 |
| | 100.0000 | 300.00 | | 3.13 | 26.80 | 12.82 | 3.55 | 121.77 | 12.51 | 1.00 | 0.89 |
| Per Serving | | | | 0.44 | 3.75 | 1.79 | 0.50 | 17.05 | 1.75 | 0.14 | 0.07 | pH = 5.32
Total Acidity = 0.85
1. Mix all ingredients cold in Stephan.
2. Homogenize at 2000 psi through Rannie Homogenizer
3. Transfer back to the Stephan and heat to 165° F.
4. Homogenize at 8000 psi through the Rannie Homogenizer
5. Package hot upside down and store @ 32–40° F.

EXAMPLE 3

| | % | Pounds Batch | Grams Batch | Fat | Solids | Protein | Lactose | cal/g Calories | mg/g Cholesterol | Salt | Ash |
|---|---|---|---|---|---|---|---|---|---|---|---|
| Water | 39.6739 | 3.97 | 1799.57 | | | | | | | | |
| Cream (36% Butter Fat) | 8.0000 | 0.90 | 362.87 | 36.00 | 41.63 | 2.03 | 2.87 | 3.47 | 1.37 | | 0.4449 |
| Dry Curd Cottage Cheese | 40.0000 | 4.00 | 1814.36 | 0.42 | 20.08 | 16.06 | 2.00 | 0.82 | 0.07 | | 0.7 |
| TMP 1240 | 3.5000 | 0.35 | 158.76 | 1.10 | 95.70 | 89.60 | 0.20 | 3.88 | 0.10 | | 5 |
| Lactose | 2.5200 | 0.25 | 114.30 | 0.00 | 100.00 | 0.00 | 100.00 | 4.00 | 0.00 | | |
| Paselli Maltodextrin SA2 ® | 4.0000 | 0.40 | 181.44 | 0.00 | 90.00 | 0.00 | 0.00 | 3.60 | 0.00 | | |
| Gelatin | 0.7500 | 0.08 | 34.02 | 0.10 | 100.00 | 85.60 | | 3.36 | | | |
| Salt | 1.0000 | 0.10 | 45.36 | | 100.00 | | | 4.00 | | 100.00 | |
| Carboxymethyl Cellu- | 0.3000 | 0.03 | 13.61 | | 88.00 | | | 3.52 | | | |

EXAMPLE 3 (continued)

| | % | Pounds Batch | Grams Batch | Fat | Solids | Protein | Lactose | cal/g Calories | mg/g Cholesterol | Salt | Ash |
|---|---|---|---|---|---|---|---|---|---|---|---|
| lose | | | | | | | | | | | |
| Guar | 0.1500 | 0.02 | 6.8039 | | 90.50 | | | 0.20 | | | |
| Natural Butter Flavor | 0.0200 | 0.00 | 0.4536 | 100.00 | 100.00 | | | 9.00 | | | |
| Locust Bean Gum | 0.0361 | 0.00 | 1.6375 | | 85.00 | | | 0.00 | | | |
| 1% Beta Carotene CWS | 0.0500 | 0.01 | 2.2680 | 0.00 | 0.00 | 0.00 | 0.00 | 0.00 | 0.00 | 0.00 | |
| | 100.0000 | 10.0000 | | 3.11 | 23.03 | 10.36 | 3.56 | 106.55 | 14.11 | 1.00 | 0.49 |
| Per Serving | | | | 0.44 | 3.22 | 1.45 | 0.50 | 14.92 | 1.98 | 0.14 | | pH = 5.31
Total Acidity = 0.78
1. Mix all ingredients cold in Stephan.
2. Homogenize at 2000 psi through Rannie Homogenizer
3. Transfer back to the Stephan and heat to 165° F.
4. Homogenize at 8000 psi through the Rannie Homogenizer
5. Package hot upside down and store @ 32-40° F.

The ingredients included in the Examples, unless already mentioned in the specification or examples, may be obtained from the following suppliers:

| Ingredient | Tradename | Supplier |
|---|---|---|
| Carboxymethylcellulose | CMC | Aqualou Company P.O. Box 271 Hopewell, VA 23860 |
| Dry Curd Cottage Cheese | | Baucroft Dairy 440 E. Patrick St. Frederick, MD 21701 |
| Non Fat Dry Milk | | Mid America Farms 3253 East Chestnut Springfield, MO 65302 |
| Paselli SA2 ® | | Avebe Avebe-wag 1 9607 PT Foxhol The Netherlands |
| Gelatin | | Extraco Stidsvig 5-264 00 Klippen Sweden |
| Salt | Morton Salt | Morton International, Inc. |
| Guar Gum | Dycol 400FC ® | Tic Gums Inc. |
| Locust Bean Gum | | Hercules Incorporated Hercules Plaza Wilmington, DE 19894 |
| 1% β-Carotene CWS | | Roche Vitamins & Fine Chemicals 340 Kingsland Street Nutley, NJ 07110-1199 |
| Neufchatel Cheese | | Emkay Trading Corp. 58 Church Street Arcade, NY 14009 |

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

What is claimed is:

1. A process of preparing a water-continuous margarine-like spread the process comprising
   (i) preparing a mixture comprising fat at a level not greater than 5%, at least about 9% casein, and a gel-forming system including a gelling agent A and a gelling agent B wherein a gelling agent A is selected from the group consisting of gelatin, kappa-carrageenan, iota-carrageenan, alginate, agar, gellan, pectin, and mixtures thereof, a gelling agent B is selected from the group consisting of gelling starch, denatured whey protein, denatured bovine serum protein, denatured soy protein, microcrystalline cellulose and mixtures thereof, wherein the amount of gelling agent A is from about 0.5% to about 1.5%, and the amount of gelling agent B is from about 2% to about 12%;
   (ii) homogenizing the mixture at a pressure in the range of from about 500 to about 14,000 psi to obtain a blend;
   (iii) heating the blend to a temperature in the range of from about 160° F. to about 180° F.;
   (iv) homogenizing the heated blend at a pressure in the range of from about 500 to about 14,000 psi to obtain the spread; and
   (v) packing the spread at a temperature of at least 140° F.

2. The method of claim 1 wherein the casein and the fat of the mixture in step (i) are obtained by mixing at least two dairy ingredients: from about 5% to about 25% of a first dairy ingredient selected from the group consisting of Neufchattel cheese, cream, cream cheese, and mixtures thereof, and from about 30% to about 70% of a second dairy ingredient selected from the group consisting of cottage cheese, low fat cottage cheese, dry curd cottage cheese, quark, creamed cottage cheese, ricotta cheese, fresh cheese and mixtures thereof.

3. The method of claim 1 wherein the casein and the fat of the mixture in step (i) are derived from a milk blend.

4. The method of claim 3 further comprising electrodialysing the milk prior to preparing the milk blend.

5. The method of claim 4 further comprising concentrating the milk blend by a procedure selected from the group consisting of bag drainage, ultrafiltration, diafiltration, centrifugation, cheese vats, ion exchange and combinations thereof.

6. A process of preparing a water-continuous margarine-like spread the process comprising
   (i) preparing a mixture comprising fat at a level not greater than 5%, at least about 9% of casein, and less than 1.05% ash;
   (ii) homogenizing the mixture at a pressure in the range of from about 500 to about 14,000 psi to obtain a blend;
   (iii) heating the blend to a temperature in the range of from about 160° F. to about 180° F.;

(iv) homogenizing the heated blend at a pressure in the range of from about 500 to about 14,000 psi to obtain the spread; and (v) packing the spread at a temperature of at least 140° F.

7. The method of claim 6 wherein the casein and the fat of the mixture in step (i) are derived from a milk blend.

8. The method of claim 6 further comprising electrodialysing the milk prior to preparing the milk blend.

9. The method of claim 8 further comprising concentrating the milk blend by a procedure selected from the group consisting of bag drainage, ultrafiltration, diafiltration, centrifugation, cheese vats, and combinations thereof.

* * * * *